United States Patent
Roussille et al.

(10) Patent No.: US 11,828,195 B2
(45) Date of Patent: Nov. 28, 2023

(54) FIBROUS PREFORM FOR THE AERODYNAMIC PROFILE OF A TURBOMACHINE BLADE

(71) Applicant: SAFRAN CERAMICS, Le Haillan (FR)

(72) Inventors: Clément Marie Benoît Roussille, Moissy-Cramayel (FR); Matthieu Arnaud Gimat, Moissy-Cramayel (FR); Julien André Roger Mateo, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/254,071

(22) PCT Filed: Nov. 8, 2021

(86) PCT No.: PCT/FR2021/051970
§ 371 (c)(1),
(2) Date: May 23, 2023

(87) PCT Pub. No.: WO2022/112678
PCT Pub. Date: Jun. 2, 2022

(65) Prior Publication Data
US 2023/0340883 A1    Oct. 26, 2023

(30) Foreign Application Priority Data

Nov. 25, 2020  (FR) ...................................... 2012109

(51) Int. Cl.
*F01D 5/28* (2006.01)
*D03D 25/00* (2006.01)
(Continued)

(52) U.S. Cl.
CPC .............. *F01D 5/282* (2013.01); *C04B 35/80* (2013.01); *D03D 1/00* (2013.01); *D03D 15/242* (2021.01);
(Continued)

(58) Field of Classification Search
CPC ........... F01D 5/282; F01D 5/18; C04B 35/80; D03D 25/005; D03D 1/00
See application file for complete search history.

(56) References Cited

U.S. PATENT DOCUMENTS

| | | | | |
|---|---|---|---|---|
| 3,301,527 A | * | 1/1967 | Kercher | .................. F01D 5/189 |
| | | | | 415/115 |
| 5,382,453 A | * | 1/1995 | Mason | ................ C04B 38/0003 |
| | | | | 427/419.7 |
| 6,451,416 B1 | * | 9/2002 | Holowczak | ............. F01D 5/284 |
| | | | | 264/332 |

FOREIGN PATENT DOCUMENTS

| | | |
|---|---|---|
| FR | 2 954 271 A1 | 6/2011 |
| WO | WO 2012/001279 A1 | 1/2012 |
| WO | WO 2015/004362 A1 | 1/2015 |

OTHER PUBLICATIONS

International Search Report as issued in International Patent Application No. PCT/FR2021/051970, dated Feb. 9, 2022.

(Continued)

*Primary Examiner* — Michael L Sehn
(74) *Attorney, Agent, or Firm* — Pillsbury Winthrop Shaw Pittman LLP

(57) ABSTRACT

A woven fibrous preform of a hollow aerodynamic profile of a turbomachine vane or blade, has a non-interlinked trailing edge and a draping of two 3D woven fibrous textures.

7 Claims, 4 Drawing Sheets

(51) Int. Cl.
*D03D 1/00* (2006.01)
*D03D 15/242* (2021.01)
*D03D 15/275* (2021.01)
*C04B 35/80* (2006.01)
*F01D 5/18* (2006.01)

(52) U.S. Cl.
CPC ......... *D03D 15/275* (2021.01); *D03D 25/005* (2013.01); *F01D 5/18* (2013.01); *C04B 2235/5256* (2013.01); *D10B 2101/16* (2013.01); *D10B 2505/02* (2013.01); *F05D 2230/50* (2013.01); *F05D 2260/20* (2013.01); *F05D 2300/6033* (2013.01)

(56) References Cited

OTHER PUBLICATIONS

Written Opinion of the International Searching Authority as issued in International Patent Application No. PCT/FR2021/051970, dated Feb. 9, 2022.

* cited by examiner

[Fig. 1]
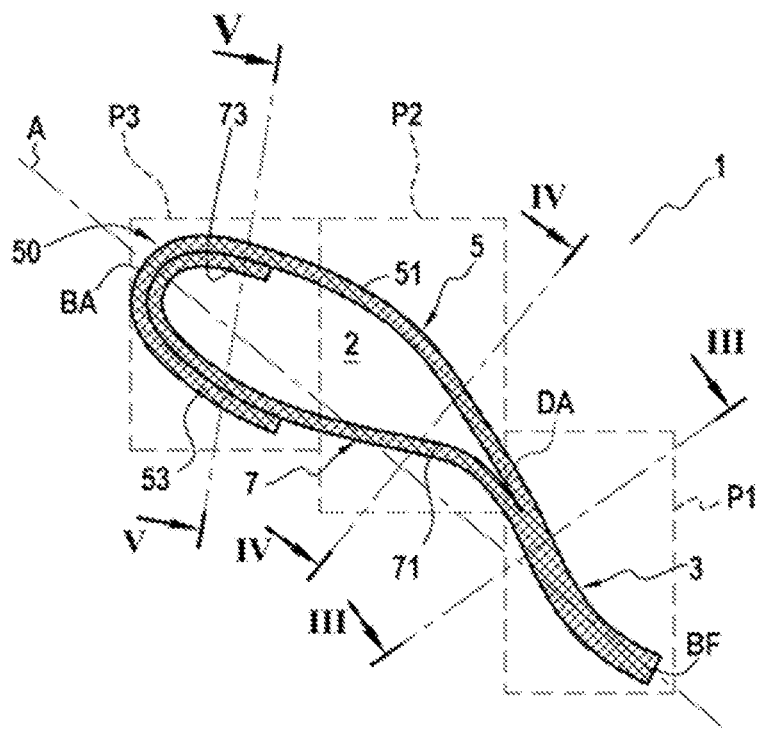
[Fig. 2]
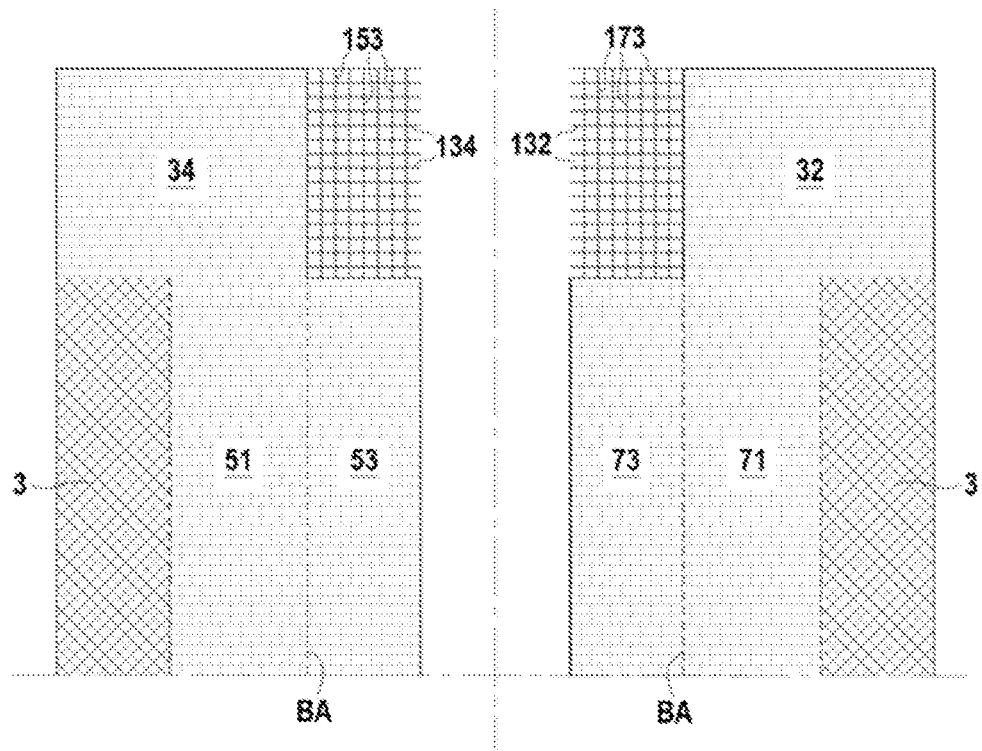

[Fig. 3]
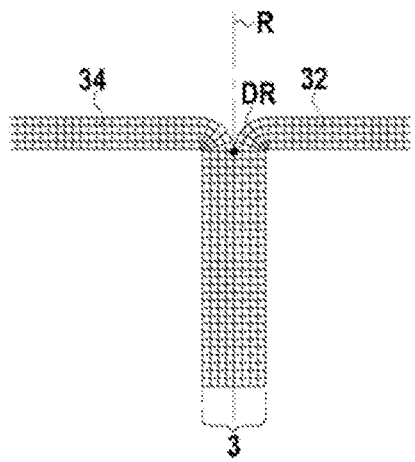
[Fig. 4]
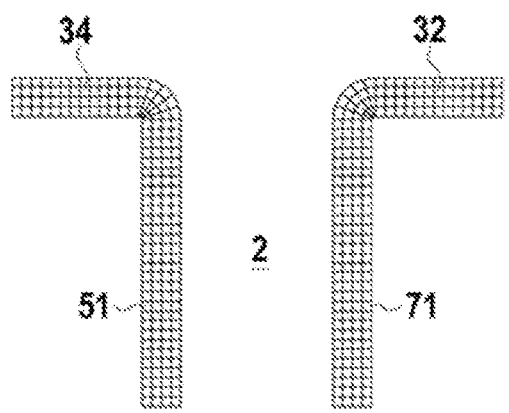
[Fig. 5]
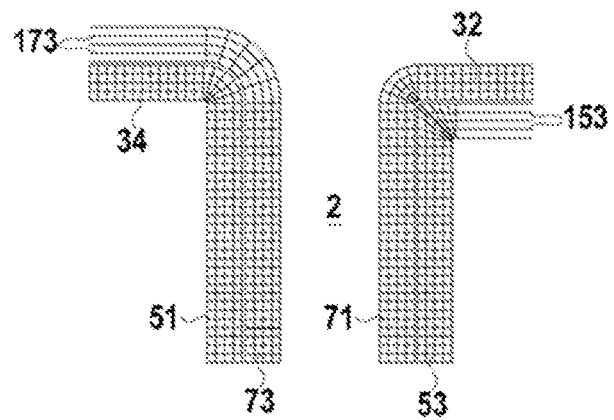

[Fig. 5A]
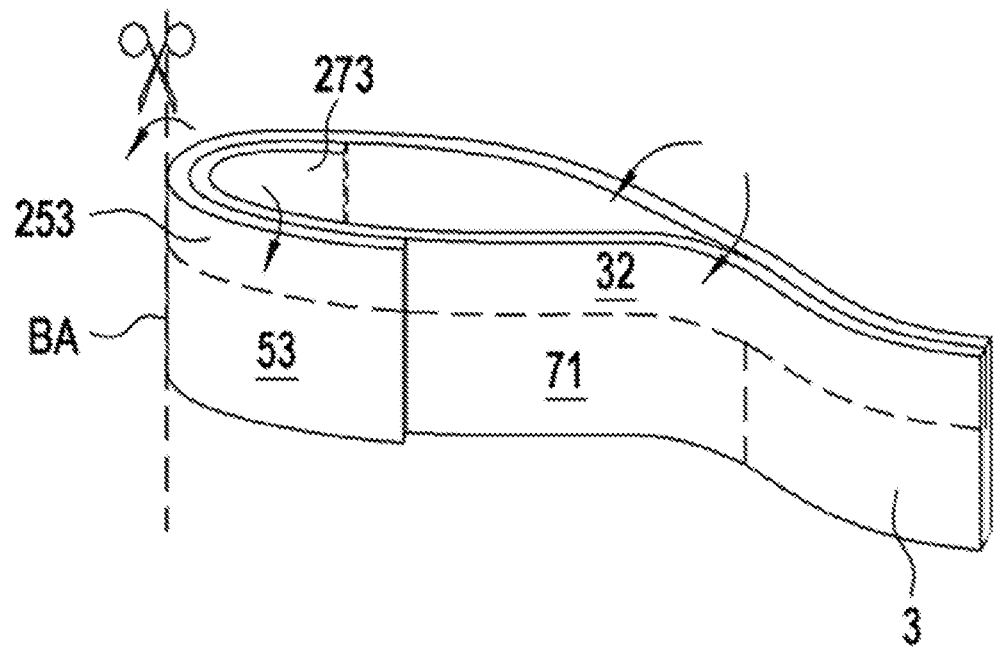
[Fig. 6]
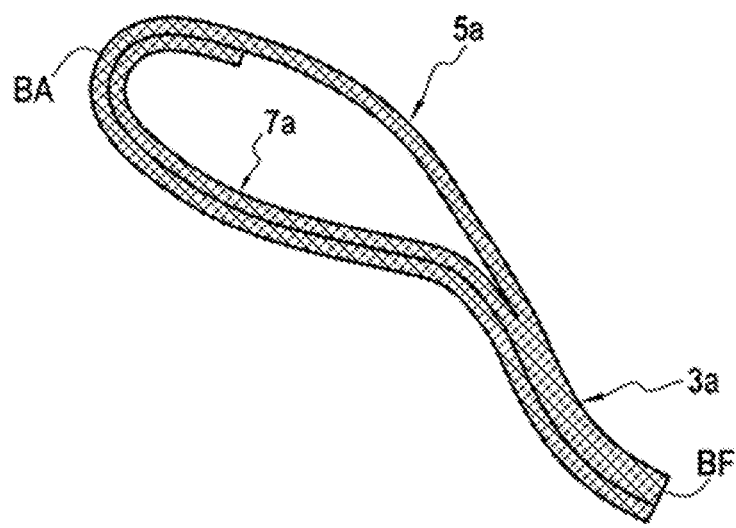

[Fig. 7]
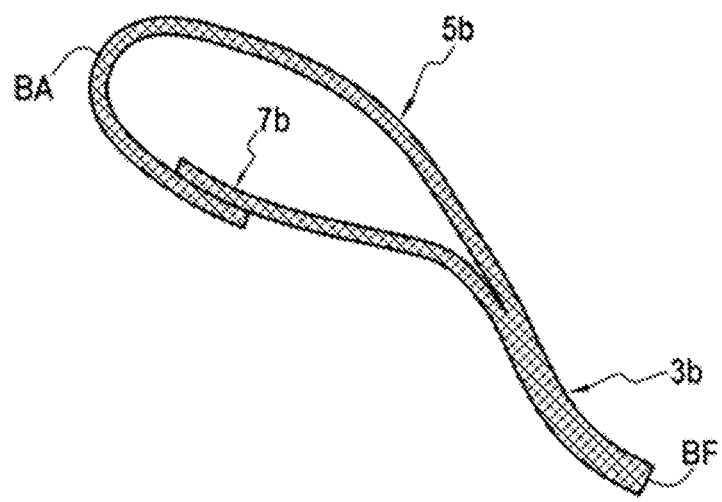
[Fig. 8]
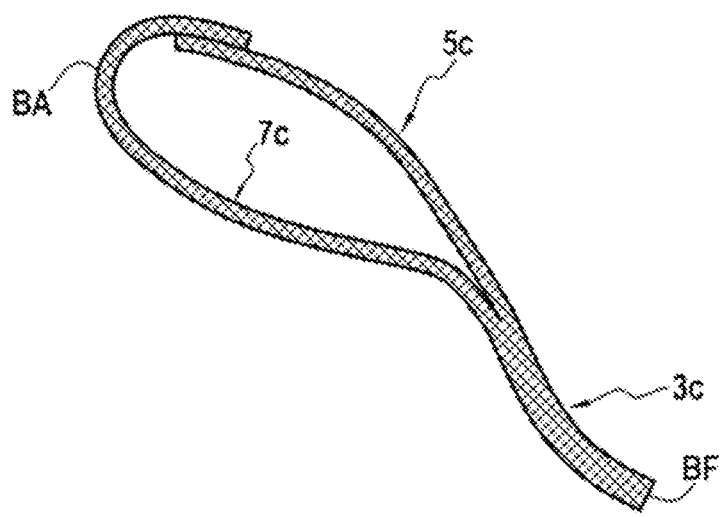

FIBROUS PREFORM FOR THE AERODYNAMIC PROFILE OF A TURBOMACHINE BLADE

CROSS-REFERENCE TO RELATED APPLICATIONS

This application is the U.S. National Stage of PCT/FR2021/051970, filed Nov. 8, 2021, which in turn claims priority to French patent application number 2012109 filed Nov. 25, 2020. The content of these applications are incorporated herein by reference in their entireties.

TECHNICAL FIELD

The invention relates to a fibrous preform of an aerodynamic profile of a turbomachine vane or blade, and particularly of a turbine nozzle vane. These vanes or blades can be intended to be integrated into the aeronautical or industrial turbomachines.

PRIOR ART

The turbine nozzles are parts linked to the casing of a turbojet engine making it possible to channel and orient the gases in the primary stream. A turbine stage is is made up of a vane assembly called "nozzle" (or stator), followed by a blade assembly or rotor (set of the turbine disk and of the blades). The turbine nozzles are made with vanes with hollow airfoils, that is to say with airfoils having an internal longitudinal passage over their entire length between their external and internal ends. Such passages make it possible to convey an air stream from the exterior to the interior, in particular for the cooling of disks of the turbine rotor wheels.

The ceramic-matrix composite materials (CMC materials) have been proposed as hot portion elements of a turbomachine. Indeed, these materials have remarkable thermostructural properties, that is to say mechanical properties which make them able to constitute structural elements and the ability to retain these properties at high temperatures. In addition, the CMC materials have a much lower density than that of the metallic materials traditionally used for hot portion elements of turbomachines.

The nozzle is subjected to forces related to the aerodynamic stream in the flowpath and to the piston effect on the casing under the nozzle (difference in pressure between the upstream and downstream cavities under the nozzle). These forces create a moment around the fixing between the nozzle and the casing.

The nozzle vanes must convey the forces through areas ensuring sufficient structural strength while having a relatively complex shape ensuring different functions, such as in particular the orientation and the distribution of the gas stream to the downstream stages (aerodynamic profile of the airfoil), the guiding of the streams through the upper and lower flowpaths (platforms) and the supply of the internal casing with cooling air. Document FR 2 954 271 which discloses an aircraft propeller airfoil is also known.

It would be desirable to have a turbomachine vane or blade ensuring, in a satisfactory manner, the resistance to the forces exerted as well as the desired functions.

DISCLOSURE OF THE INVENTION

The invention relates to a fibrous preform of a hollow aerodynamic profile of a turbomachine vane or blade, the preform being made in one piece and having successively along an axial direction a first downstream portion defining a trailing edge of the vane or blade, a second intermediate portion defining a pressure surface and a suction surface of the vane or blade and a third upstream portion defining a leading edge of the vane or blade, the fibrous preform being characterized in that (i) the first downstream portion is formed by a first fibrous texture having a three-dimensional weaving, in that (ii) the second intermediate portion and the third upstream portion are formed by second and third non-interlinked fibrous textures extending from the first fibrous texture, the second and third fibrous textures each having a three-dimensional weaving, and in that (iii) a portion of the second or third non-interlinked fibrous texture is folded over the third or second non-interlinked fibrous texture so as to overlap it, this folded portion being obtained by three-dimensional weaving.

The fibrous preform presents a good compromise between structural strength and variety of achievable cambers for the profile. The fibrous preform, formed in one piece, has continuous textile reinforcement which is advantageous from the point of view of structural strength. Furthermore, the trailing edge, formed by the same texture obtained by three-dimensional weaving, provides improved structural strength compared to a trailing edge formed by superimposing two fibrous textures by avoiding the generation of an adhesive area. The fold of the portion of one of the second or third texture on the other of the second or third texture makes it possible to achieve more possible cambers for the profile by authorizing significant differences in lengths developed between the pressure surface and the suction surface.

In one exemplary embodiment, the fibrous preform is a turbine nozzle vane preform, the first downstream portion having a non-interlinking in a radial direction from an airfoil portion forming two non-interlinked fibrous sections extending from the airfoil portion, said fibrous sections defining a fibrous reinforcement of a platform of the vane and the second and third non-interlinked fibrous textures being extended in the radial direction by the non-interlinked fibrous sections.

In one exemplary embodiment, the second and third non-interlinked fibrous textures are draped over each other so as to overlap each other at least on the leading edge. As a variant, the second and third non-interlinked fibrous textures are draped over each other so as to overlap each other in a distinct area of the leading edge.

The invention also relates to a turbomachine vane or blade made of ceramic-matrix composite material comprising a fibrous preform as described above, and a ceramic matrix present in the porosity of the fibrous preform.

The invention also relates to a method for manufacturing a fibrous preform as described above, comprising at least:
the weaving of a fibrous blank in one piece comprising at least (i) the formation of the first downstream portion by three-dimensional weaving of the first fibrous texture, and (ii) the production of a non-interlinking in the axial direction from the first downstream portion so as to form the second and third non-interlinked fibrous textures extending from the first fibrous texture, and
the formation of the fibrous preform by positioning of the blank around a shape and draping of the second and third non-interlinked fibrous textures over each other so that they overlap each other.

In one exemplary embodiment, the weaving of the blank further comprises the production of a non-interlinking in the radial direction from the airfoil portion of the first downstream portion in order to form the non-interlinked fibrous sections defining the fibrous reinforcement of the platform of the vane, the second and third non-interlinked fibrous textures being extended in the radial direction by the non-interlinked fibrous sections, a fibrous nozzle vane preform being obtained after positioning of the blank around the shape and draping of the second and third non-interlinked fibrous textures.

BRIEF DESCRIPTION OF THE DRAWINGS

FIG. 1 schematically represents an example of a fibrous preform according to the invention in sectional view in a plane transverse to the radial direction and at the level of an airfoil portion.

FIG. 2 represents in a schematic and flat manner, the fibrous blank before shaping to form the fibrous preform of FIG. 1 seen from two different sides.

FIG. 3 schematically represents the fibrous preform of FIG. 1 in sectional view in a plane transverse to the axial direction and at the level of the first downstream portion.

FIG. 4 schematically represents the fibrous preform of FIG. 1 in sectional is view in a plane transverse to the axial direction and at the level of the second intermediate portion.

FIG. 5 schematically represents the fibrous preform of FIG. 1 in sectional view in a plane transverse to the axial direction and at the level of the third upstream portion.

FIG. 5A schematically represents a fibrous blank variant intended to form a fibrous preform according to the invention.

FIG. 6 schematically represents another example of a fibrous preform according to the invention in sectional view in a plane transverse to the radial direction and at the level of an airfoil portion.

FIG. 7 schematically represents another example of a fibrous preform according to the invention in sectional view in a plane transverse to the radial direction and at the level of an airfoil portion.

FIG. 8 schematically represents another example of a fibrous preform according to the invention in sectional view in a plane transverse to the radial direction and at the level of an airfoil portion.

DESCRIPTION OF THE EMBODIMENTS

FIG. 1 is a view in a plane transverse to the radial direction R, this direction being represented in FIG. 3, taken at the level of the airfoil portion of a fibrous preform 1 of a turbine nozzle vane. The fibrous preform 1 is intended to form the fibrous reinforcement of the vane.

The preform 1 has successively along the axial direction A a first downstream portion P1 defining a trailing edge BF of the vane, a second intermediate portion P2 defining a pressure surface and a suction surface of the vane and a third upstream portion P3 defining a leading edge BA of the vane.

The axial direction A corresponds to the direction of flow of the gas stream in the so flowpath in which the vane is intended to be mounted. The radial direction R corresponds to the direction along a radius of the portion of the turbomachine in which the vane is intended to be mounted (straight line connecting the center of this portion to its periphery). The radial direction corresponds to the direction along the height of the vane. Here, the radial direction R corresponds to the direction is according to a radius of the turbine nozzle.

On an airfoil portion, the first portion P1 is formed by a single first fibrous texture 3 obtained by three-dimensional weaving. In the example illustrated, the first fibrous texture 3 extends beyond the airfoil portion in the radial direction R to form two non-interlinked fibrous sections 32 and 34 defining a fibrous reinforcement of a platform of the vane, here the external platform (see FIGS. 2 and 3). In the first portion P1, a first non-interlinking, denoted DR, is produced in the radial direction R in order to split the first texture 3 into two non-interlinked fibrous sections 32 and 34. The non-interlinked fibrous sections 32 and 34 are each obtained by three-dimensional weaving. The fibrous sections 32 and 34 are in the textile continuity of the first texture 3. A similar structure, not illustrated, can be used to form the fibrous reinforcement of the internal platform. The terms "internal" and "external" are used with respect to the radial direction R. In a manner known per se, a non-interlinking is produced between two layers of warp yarns by not passing weft yarns through the non-interlinking area so as not to interlink layers of warp yarns located on either side of the non-interlinking. Throughout the text, the roles between warp yarns and weft yarns are interchangeable.

A second non-interlinking DA, produced in the axial direction A, is present in the airfoil portion in order to form, from the first texture 3, second and third non-interlinked fibrous textures 5 and 7. The second and third non-interlinked fibrous textures 5 and 7 are each obtained by three-dimensional weaving. The second non-interlinked texture 5 forms the suction surface of the vane and the third non-interlinked texture 7 forms the pressure surface of the vane. The second and third non-interlinked textures 5 and 7 extend in the textile continuity of the first texture 3. The second and third non-interlinked textures 5 and 7 here each comprise a first section 51 and 71 which extends from the non-interlinking DA to the leading edge BA. Each first section 51 and 71 is obtained by three-dimensional weaving. The fibrous sections 32 and 34 forming the reinforcement of the platform extend in the textile continuity of the first sections 51 and 71 in the radial direction R. FIG. 4 is a sectional view of the second portion P2 taken transversely to the axial direction A and illustrates this point.

The second and third non-interlinked fibrous textures 5 and 7 are draped over each other so as to overlap each other. The overlapping of the second 5 and third 7 fibrous textures can take place on the third upstream portion P3, as in the example illustrated. The second 5 and third 7 fibrous textures overlap each other here at least on the leading edge BA but there is no departure from the scope of the invention when they overlap each other on a distinct area of the leading edge, as will be illustrated in the following. One of the second and third fibrous textures 5 or 7 is here wound around the other of the second and third fibrous textures 7 or 5 in the third upstream portion P3. In the example, the second fibrous texture 5 is wound around the third fibrous texture 7 but the reverse can be made. The portion 50 of one of the second and third fibrous textures 5 or 7 draped over the other of the second and third fibrous textures 7 or 5 and overlapping it is obtained by three-dimensional weaving.

In the example illustrated, the second and third non-interlinked fibrous textures 5 and 7 extend beyond the leading edge BA and have, from the leading edge BA, a second section 53 and 73. Each second section 53 and 73 is obtained by three-dimensional weaving. The second section 53 or 73 is in the textile continuity of the first section 51 and 71. In the example illustrated, the first 51 and second 53 sections form a portion 50 of the second non-interlinked fibrous texture 5 which is folded over the third non-interlinked texture fibrous 7 so as to overlap it, this folded portion being obtained by three-dimensional weaving. On the other hand and unlike the first section 51 and 71, the extension of the second sections 53 and 73 at the level of the platform may not be woven. Thus and as illustrated in FIGS. 2 and 5, unidirectional layers 153 and 173 of first non-woven yarns extend in the extension of the second section 53 and 73 along the radial direction R. Similarly, unidirectional layers 134 and 132 of second non-woven yarns extend in the extension along the axial direction A of each fibrous section 32 and 34. The unidirectional layers 153 or 173 of one of the second and third fibrous textures 5 or 7 are facing the fibrous section 32 or 34 of the other of the second and third fibrous textures 7 or 5 in the third upstream section P3 (FIG. 5). FIG. 5A represents one variant which differs from FIG. 2 by the presence of woven areas 253 and 273 instead of the non-woven areas formed by the unidirectional layers 132, 134, 153 and 173. In this case, a cutout along the leading edge BA in the non-flowpath area makes it possible to fold back the platform reinforcements, as illustrated.

The fibrous preform 1 defines a hollow aerodynamic profile of the vane. The fibrous preform 1 thus comprises an inner longitudinal passage 2 extending along the radial direction R. In the example illustrated relating to a nozzle vane, the inner longitudinal passage 2 is intended to be traversed by the cooling air stream. The longitudinal passage 2 can receive a metal mast making it possible to take up the mechanical forces. The pressure surface and the suction surface delimit the longitudinal passage 2. The longitudinal passage 2 is present between the pressure surface and the suction surface.

The yarns forming the fibrous preform 1 can be made of ceramic, in particular of silicon carbide (SiC), or carbon.

The texture wound around the other texture can stop on the pressure surface or the suction surface. FIG. 6 represents one variant where the first fibrous texture 3a is non-interlinked into a second 5a and a third 7a fibrous texture, the second texture 5a being folded over the third texture 7a and extending to the trailing edge BF. FIGS. 7 and 8 illustrate variants where the first fibrous texture 3b, 3c is non-interlinked into a second 5b, 5c and a third 7b, 7c fibrous texture with draping and overlapping of the second and third fibrous textures on the pressure surface or the suction surface and in a distinct area of the leading edge BA. It is possible to extend, in one non-illustrated variant, the folded texture 5b, 7c of the examples of FIGS. 7 and 8 to the trailing edge BF. According to another non-illustrated variant, the overlap between the second and third non-interlinked fibrous textures 5 or 7 stops at the leading edge BA (the non-interlinked textures have no second sections 53 and 73 extending beyond the leading edge).

To form the first fibrous preform 1, it is first possible to produce a fibrous blank by three-dimensional weaving from yarns made of ceramic, in particular silicon carbide (SiC), or carbon. The fibrous blank is produced in one piece and comprises the formation of the first fibrous texture 3 by three-dimensional weaving in the first downstream portion with the production of the non-interlinking DA in the axial is direction A so as to form the second and third non-interlinked fibrous textures 5 and 7 and the production of the non-interlinking DR in the radial direction R so as to form the two non-interlinked fibrous sections 32 and 34. The weaving at the level of the non-interlinked fibrous sections 32 and 34 is then stopped in the area intended to extend beyond of the leading edge BA after shaping.

The blank is then shaped around a shape by draping a non-interlinked texture 5 or 7 around the other non-interlinked texture 7 or 5 at least at the level of the leading edge BA in the case of the example of the FIG. 1 in particular and by folding back the non-interlinked fibrous sections 32 and 34 at the level of the non-interlinking DR to form the platform reinforcement.

The unidirectional layers of yarns 153, 173, 134 and 132 can then be cut and then the matrix can be formed in the porosity of the thus obtained fibrous preform.

The matrix can be formed, in whole or in part, by Chemical Vapor Infiltration, or by the liquid route. The liquid route technique can be a Melt Infiltration (MI) or a Polymer Impregnation Pyrolysis (PIP) technique. The formation of the ceramic matrix by the techniques mentioned is known per se. It will be noted that a combination of these techniques can be used to form the matrix. The matrix can include silicon carbide, for example.

A turbine nozzle vane of a turbomachine, for example an aeronautical turbine engine, is obtained after formation of the matrix. The vane is made of CMC material and comprises an airfoil and internal and external platforms. The external face of the internal platform and the internal face of the external platform are intended to delimit the flowpath of gas flow in the nozzle after mounting of the vane in the nozzle. The turbine nozzle can be obtained by mounting a set of vanes as described above in a turbine casing.

The case of the manufacture of a nozzle vane has been described, but the invention can be generalized to the formation of any aerodynamic profile, for example of a mobile blade, not necessarily comprising a platform. In which case, after obtaining the hollow aerodynamic profile, it is possible to insert into the cavity a spar forming part of the root in order to obtain the blade.

The invention claimed is:

1. A fibrous preform of a hollow aerodynamic profile of a turbomachine vane or blade, the preform being made in one piece and comprising successively along an axial direction a first downstream portion defining a trailing edge of the vane or blade, a second intermediate portion defining a pressure surface and a suction surface of the vane or blade and a third upstream portion defining a leading edge of the vane or blade,
   wherein (i) the first downstream portion is formed by a first fibrous texture having a three-dimensional weaving, wherein (ii) the second intermediate portion and the third upstream portion are formed by second and third non-interlinked fibrous textures extending from the first fibrous texture, the second and third fibrous textures each having a three-dimensional weaving, and wherein (iii) a portion of the second or third non-interlinked fibrous texture is folded over the third or second non-interlinked fibrous texture, respectively, so as to overlap the third or second non-interlinked fibrous texture, respectively, said folded portion being obtained by three-dimensional weaving.

2. The fibrous preform according to claim 1, wherein the fibrous preform is a turbine nozzle vane preform, in which the first downstream portion has comprises a non-interlinking in a radial direction from an airfoil portion forming two non-interlinked fibrous sections extending from the airfoil portion, said fibrous sections defining a fibrous reinforcement of a platform of the vane and in which the second and third non-interlinked fibrous textures are extended in the radial direction by the non-interlinked fibrous sections.

3. The fibrous preform according to claim 1, wherein the second and third non-interlinked fibrous textures are draped over each other so as to overlap each other at least on the leading edge.

4. The fibrous preform according to claim 1, wherein the second and third non-interlinked fibrous textures are draped over each other so as to overlap each other in a distinct area of the leading edge.

5. A turbomachine vane or blade made of ceramic-matrix composite material comprising the fibrous preform according to claim 1, and a ceramic matrix present in the porosity of the fibrous preform.

6. A method for manufacturing the fibrous preform according to claim 1, comprising:

weaving a fibrous blank in one piece comprising (i) formation of the first downstream portion by three-dimensional weaving of the first fibrous texture, and (ii) production of a non-interlinking in the axial direction from the first downstream portion so as to form the second and third non-interlinked fibrous textures extending from the first fibrous texture, and forming the fibrous preform by positioning of the blank around a shape and draping of the second and third non-interlinked fibrous textures over each other so that the second and third non-interlinked fibrous textures overlap each other.

7. The method according to claim 6, wherein the weaving of the blank further comprises the production of a non-interlinking in the radial direction from the airfoil portion of the first downstream portion in order to form the non-interlinked fibrous sections defining the fibrous reinforcement of the platform of the vane, the second and third non-interlinked fibrous textures being extended in the radial direction by the non-interlinked fibrous sections, and wherein a fibrous nozzle vane preform is obtained after positioning of the blank around the shape and draping of the second and third non-interlinked fibrous textures.

* * * * *

UNITED STATES PATENT AND TRADEMARK OFFICE
CERTIFICATE OF CORRECTION

PATENT NO. : 11,828,195 B2
APPLICATION NO. : 18/254071
DATED : November 28, 2023
INVENTOR(S) : Clément Marie Benoît Roussille et al.

It is certified that error appears in the above-identified patent and that said Letters Patent is hereby corrected as shown below:

In the Claims

In Claim 2, Column 6, Line 57, should read:
   The fibrous preform according to claim 1, wherein the fibrous preform is a turbine nozzle vane preform, in which the first downstream portion comprises a non-interlinking in a radial direction from an airfoil portion forming two non-interlinked fibrous sections extending from the airfoil portion, said fibrous sections defining a fibrous reinforcement of a platform of the vane and in which the second and third non-interlinked fibrous textures are extended in the radial direction by the non-interlinked fibrous sections.

Signed and Sealed this
Second Day of January, 2024

Katherine Kelly Vidal
*Director of the United States Patent and Trademark Office*